(12) United States Patent
Cofer

(10) Patent No.: US 6,726,236 B2
(45) Date of Patent: Apr. 27, 2004

(54) JACK ASSEMBLY AND METHODS OF USE

(76) Inventor: Archie Cofer, P.O. Box 685, Nicoma Park, OK (US) 73066

( * ) Notice: Subject to any disclaimer, the term of this patent is extended or adjusted under 35 U.S.C. 154(b) by 0 days.

(21) Appl. No.: 10/008,833

(22) Filed: Dec. 6, 2001

(65) Prior Publication Data

US 2003/0020270 A1 Jan. 30, 2003

Related U.S. Application Data

(63) Continuation-in-part of application No. 09/918,196, filed on Jul. 30, 2001, now Pat. No. 6,386,572.

(51) Int. Cl.[7] .............................. B60D 1/36; B60D 1/66
(52) U.S. Cl. ..................... 280/475; 254/420; 280/477; 280/763.1
(58) Field of Search ................................ 280/475, 477, 280/429, 431, 511, 764.1, 765.1, 766.1, 763.1; 33/264, 386; 116/28 R; 254/420

(56) References Cited

U.S. PATENT DOCUMENTS

| | | | |
|---|---|---|---|
| 2,580,545 A | * | 1/1952 | Hill |
| 2,837,312 A | | 6/1958 | Troche |
| 2,882,070 A | * | 4/1959 | Bill |
| 2,984,011 A | | 5/1961 | Hamilton |
| 3,159,917 A | * | 12/1964 | Whitehead |
| 3,363,318 A | * | 1/1968 | Folkins et al. |
| 3,484,136 A | | 12/1969 | Colson |
| 3,720,000 A | | 3/1973 | Schlegel |
| 3,858,966 A | * | 1/1975 | Lowell, Jr. .................. 280/477 |
| 3,874,696 A | * | 4/1975 | Gardener et al. ........... 280/427 |
| 3,901,536 A | * | 8/1975 | Black .......................... 280/477 |
| 3,944,259 A | * | 3/1976 | Miller ......................... 280/475 |
| 4,065,147 A | | 12/1977 | Ross |
| 4,071,147 A | | 1/1978 | Hornagold |
| 4,162,798 A | * | 7/1979 | Foley .......................... 280/475 |
| 4,169,579 A | | 10/1979 | Moll |
| 4,552,376 A | * | 11/1985 | Cofer .......................... 280/477 |
| 4,621,432 A | * | 11/1986 | Law ............................. 22/264 |
| 4,662,610 A | * | 5/1987 | Cofer .......................... 254/420 |
| 4,852,901 A | | 8/1989 | Beasley et al. |
| 4,863,184 A | * | 9/1989 | Mena .......................... 280/475 |
| 4,938,495 A | | 7/1990 | Beasley et al. |
| 5,108,123 A | | 4/1992 | Rubenzik |
| 5,191,328 A | | 3/1993 | Nelson |
| 5,285,205 A | | 2/1994 | White |
| 5,335,930 A | * | 8/1994 | Tighe .......................... 280/432 |
| 5,409,251 A | * | 4/1995 | Thorndyke .................. 280/475 |
| 5,455,557 A | | 10/1995 | Noll et al. |
| 5,513,870 A | | 5/1996 | Hickman |
| 5,575,493 A | * | 11/1996 | Schwartz et al. ........... 280/402 |
| 5,657,175 A | | 8/1997 | Brewington |
| 5,729,194 A | | 3/1998 | Spears et al. |
| 5,806,196 A | * | 9/1998 | Gibbs et al. ................. 33/333 |
| 6,139,041 A | * | 10/2000 | Murphy ...................... 280/477 |
| 6,168,181 B1 | * | 1/2001 | Gadd ........................... 280/477 |
| 6,209,902 B1 | | 4/2001 | Potts |
| 6,273,448 B1 | | 8/2001 | Cross |
| 6,386,572 B1 | * | 5/2002 | Cofer .......................... 280/477 |

FOREIGN PATENT DOCUMENTS

| | | |
|---|---|---|
| DE | 549769 | 4/1932 |
| IT | 551157 | 11/1956 |

* cited by examiner

*Primary Examiner*—Anne Marie Boehler
(74) *Attorney, Agent, or Firm*—Dunlap, Codding & Rogers P.C.

(57) ABSTRACT

The present invention relates generally to a jack stand and methods of making and using same. In particular, but not by way of limitation, the present invention relates to a jack stand having (1) a targeting assembly for use in aligning the jack stand when attached to a trailer with an operating vehicle; and (2) means for automatically moving the foot assembly of the jack stand from a ground engaging configuration to an upright stored configuration.

4 Claims, 6 Drawing Sheets

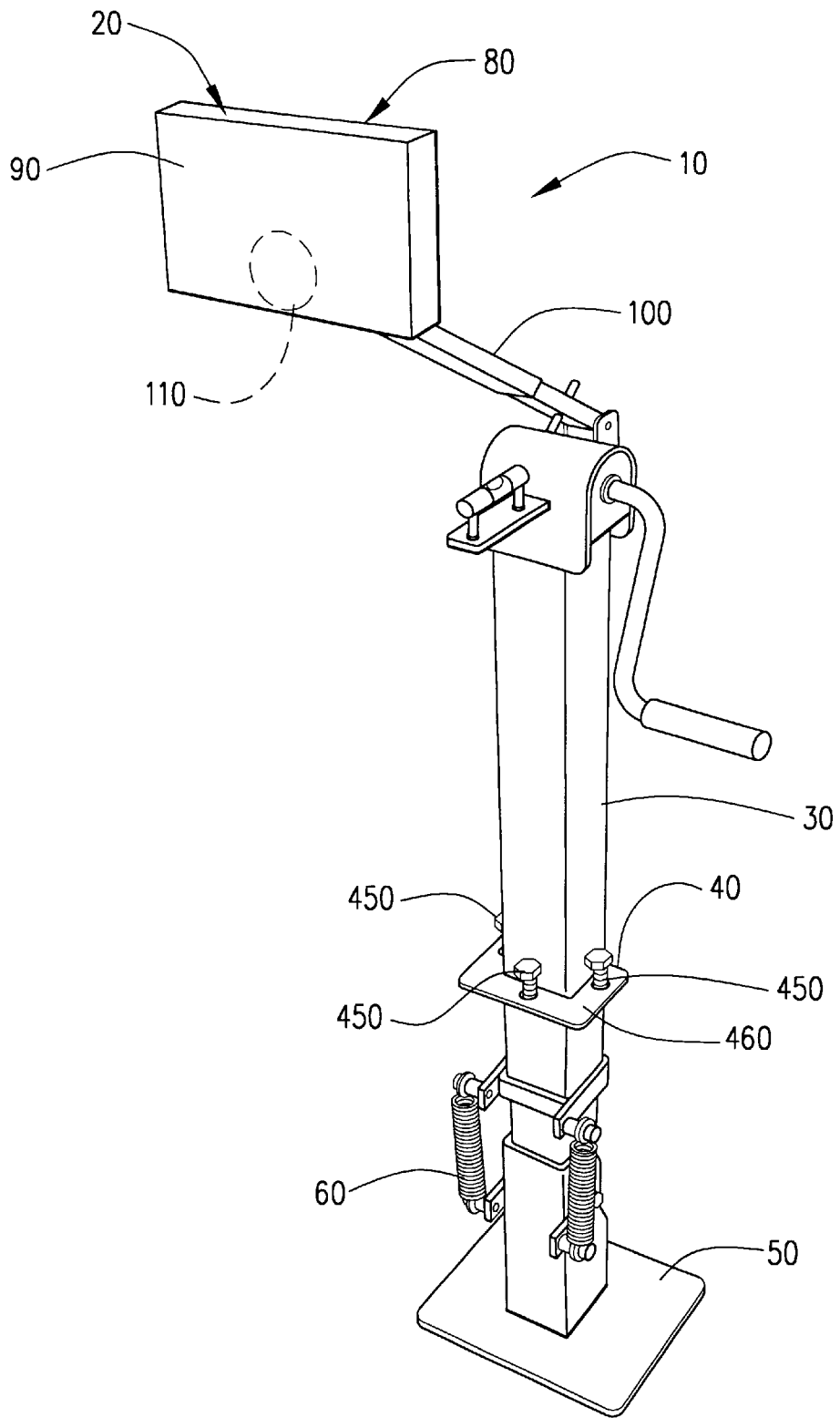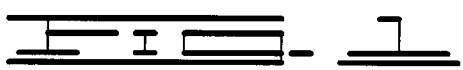

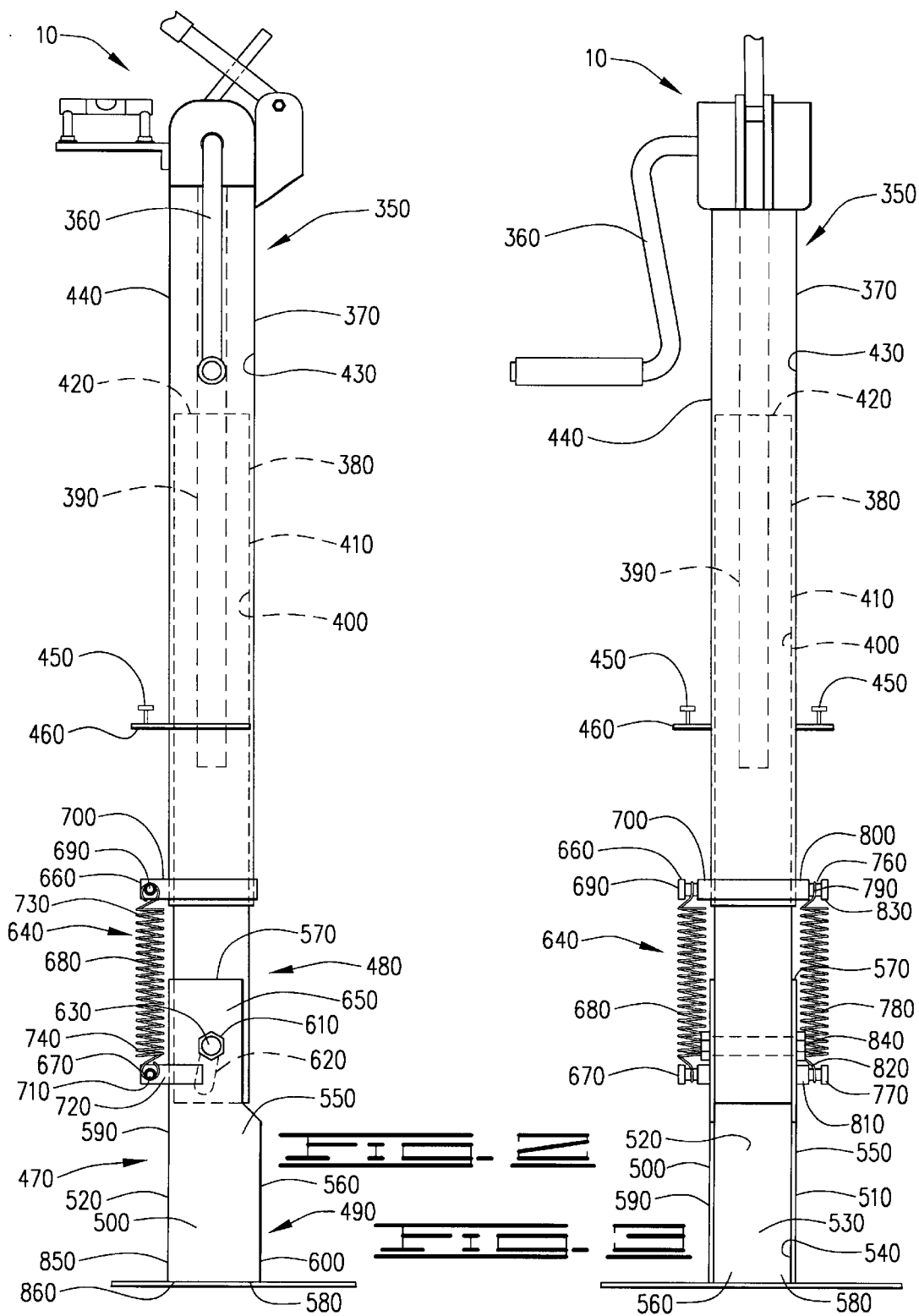

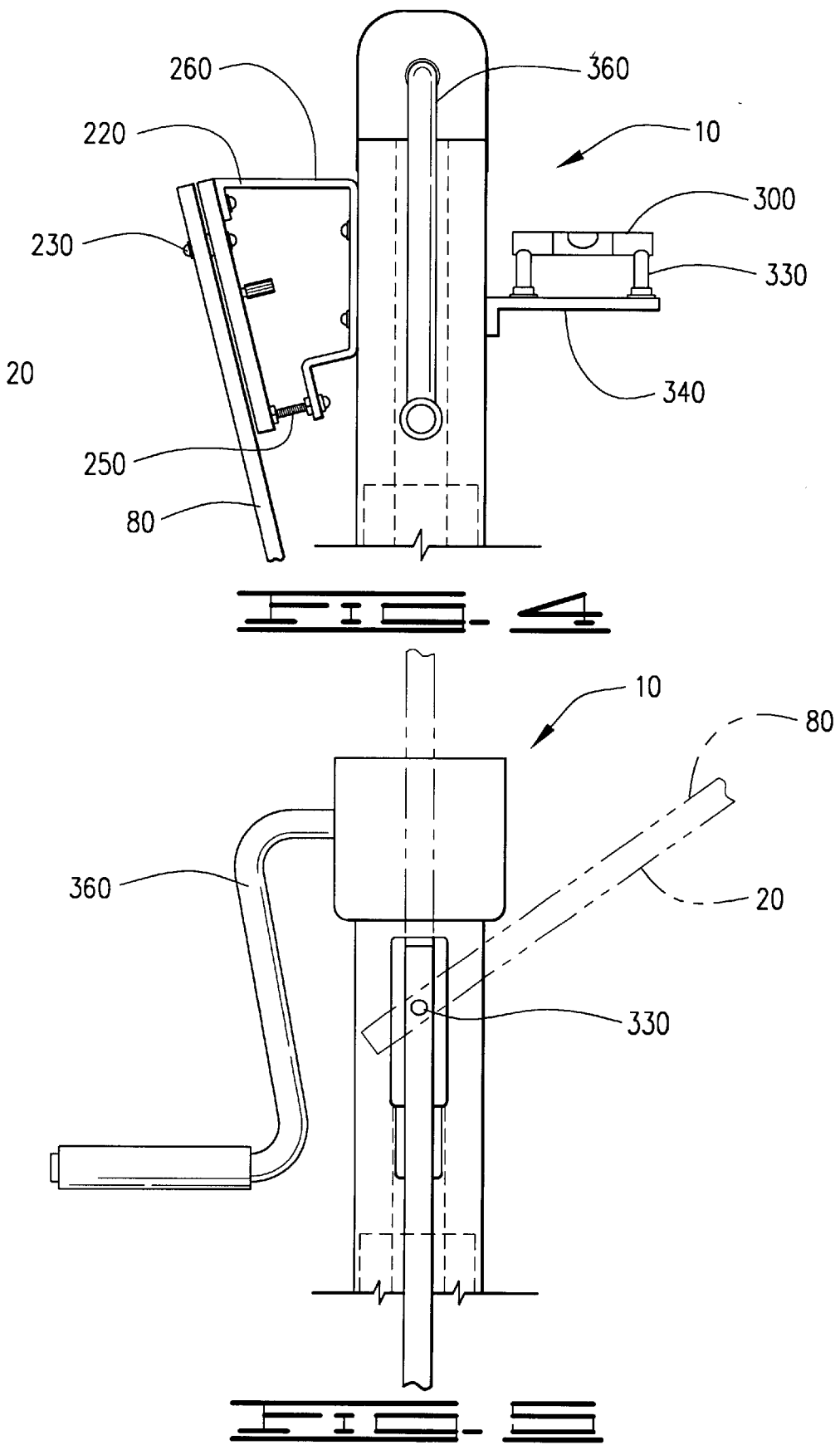

JACK ASSEMBLY AND METHODS OF USE

CROSS-REFERENCE TO RELATED APPLICATIONS

This application is a continuation-in-part of application U.S. Ser. No. 09/918,196 entitled "TRAILER HITCH APPARATUS AND METHODS OF USING SAME" filed Jul. 30, 2001 now U.S. Pat. No. 6,386,572.

BACKGROUND OF THE INVENTION

1. Field of the Invention

The present invention relates generally to a jack stand and methods of making and using same. In particular, but not by way of limitation, the present invention relates to a jack stand having (1) a targeting assembly for use in aligning the jack stand when attached to a trailer with an operating vehicle; and (2) means for automatically moving the foot assembly of the jack stand from a ground engaging configuration to an upright stored configuration.

2. Description of the Related Art

The tongue of a two-wheel trailer is conventionally provided with a trailer jack having a telescoping vertical element which extends below the plane of the trailer tongue. At the end of this telescoping vertical element is typically found a "foot" which rests on the ground to support and/or level the forward end of the trailer. In order for the trailer jack to be out of the way during towing, it was traditional for the entirety of the trailer jack to be pivoted such that the trailer jack was in a substantially horizontal alignment with the trailer tongue when the trailer was attached to a towing vehicle. Alternately, the foot would have to be elevated a considerable distance off of the ground in order for the trailer jack to clear any obstacles or uneven areas in the road to be traveled. Along unimproved roads, the distance required for the trailer jack to clear any such obstacles would often be extensive or not quite enough leading to situations where the trailer tongue would become lodge in the ground rendering any movement futile.

Either of the above-mentioned means for moving the trailer jack out of the way during transport require significant physical exertion on the part of the operator. If the trailer jack is pivoted into a horizontal position, oftentimes the pins and springs used during the pivoting process have been corroded or rusted by exposure to the weather. If these items have frozen in place, the operator has no choice but to expend considerable effort to free them in order to move the trailer jack into the horizontal position. If the trailer jack is elevated to a height sufficient to clear obstacles in the road, the elevation must be quite extensive in order to clear all potential obstacles. Additionally, the operator must exert extensive effort to ensure that the elevation is accomplished while the mechanical means for elevating the trailer hitch are oftentimes rusted and/or frozen.

Using the prior art trailer jacks on a trailer tongue, it has also been common practice to provide one or a plurality of wooden planks or blocks to underlie the foot portion of the trailer jack so that the foot does not sink into the ground. This has the disadvantage, however, that these block units are not easily and conveniently stored for travel and by age and weathering tend to deteriorate and eventually crack or split.

Examples of these types of traditional trailer jacks are shown in U.S. Pat. Nos. 3,957,249, 4,078,774, and 4,662,610. These patents show a trailer jack foot extending the length of the jack and including a self-storing feature formed by a U-shaped anchor arm which engages a portion of the jack below the trailer tongue or the trailer tongue A-frame. In the first two patents, the jack extension is secured to the trailer jack when in travel position by downward pressure of the trailer jack plunger on the platform base of the foot of the trailer jack.

The present invention is distinct over the prior art, such as the above-referenced patents, by providing a trailer jack having an automatic means for moving the foot of the trailer jack from a ground engaging position to a stored upright configuration. The trailer jack of the present invention also includes a target assembly which can be used in conjunction with a signal assembly having a means for emitting at least one converging light ray such that the trailer which is attached to the trailer jack can be easily attached to a towing vehicle for transport.

These and other advantages of the present invention are shown and explained in the following description and drawings.

SUMMARY OF THE INVENTION

The present invention generally relates to a jack apparatus having several components, including: (1) a target assembly having an upright target member; (2) a foot assembly capable of being reversibly moved from a ground engaging configuration to an upright stored configuration; and (3) means for automatically moving the foot assembly from the ground engaging configuration to the upright stored configuration. Furthermore, the jack apparatus may also include a vertical assembly having an adjustable length, and the vertical assembly may be adjusted by a means for extending the length of the vertical assembly.

In an alternative embodiment, the length extension means is a cam assembly. Additionally, the target assembly may further include a support member for holding the target assembly in a predefined angular position relative to the jack apparatus. The support member may also include an extension member and an angular loft regulator while the target assembly may also further include (1) a base member; (2) a lid for closing the base member; and (3) wherein the extension member is slidably movable for adjusting the translucent panel in a lateral horizontal direction.

In an additional embodiment, the automatic foot moving means includes a tension assembly and a pivot assembly, wherein the pivot assembly is angularly positioned to a vertical plane extending through the jack apparatus.

Furthermore, the tension assembly may also include two springs operably associated with opposing sides of the vertical assembly and the foot assembly.

BRIEF DESCRIPTION OF THE SEVERAL VIEWS OF THE DRAWINGS

FIG. 1 is a perspective view of one embodiment of a jack apparatus of the present invention.

FIG. 2 is a side elevational view of one embodiment of the jack apparatus of the present invention.

FIG. 3 is a rear elevational view of one embodiment of the jack apparatus of the present invention.

FIG. 4 is a fragmented side elevational view of an alternate embodiment of a jack apparatus of the present invention.

FIG. 6 is a fragmented side elevational view of a jack apparatus of the present invention showing the foot portion in a ground engaging configuration.

DETAILED DESCRIPTION OF THE INVENTION

Figure 1A:
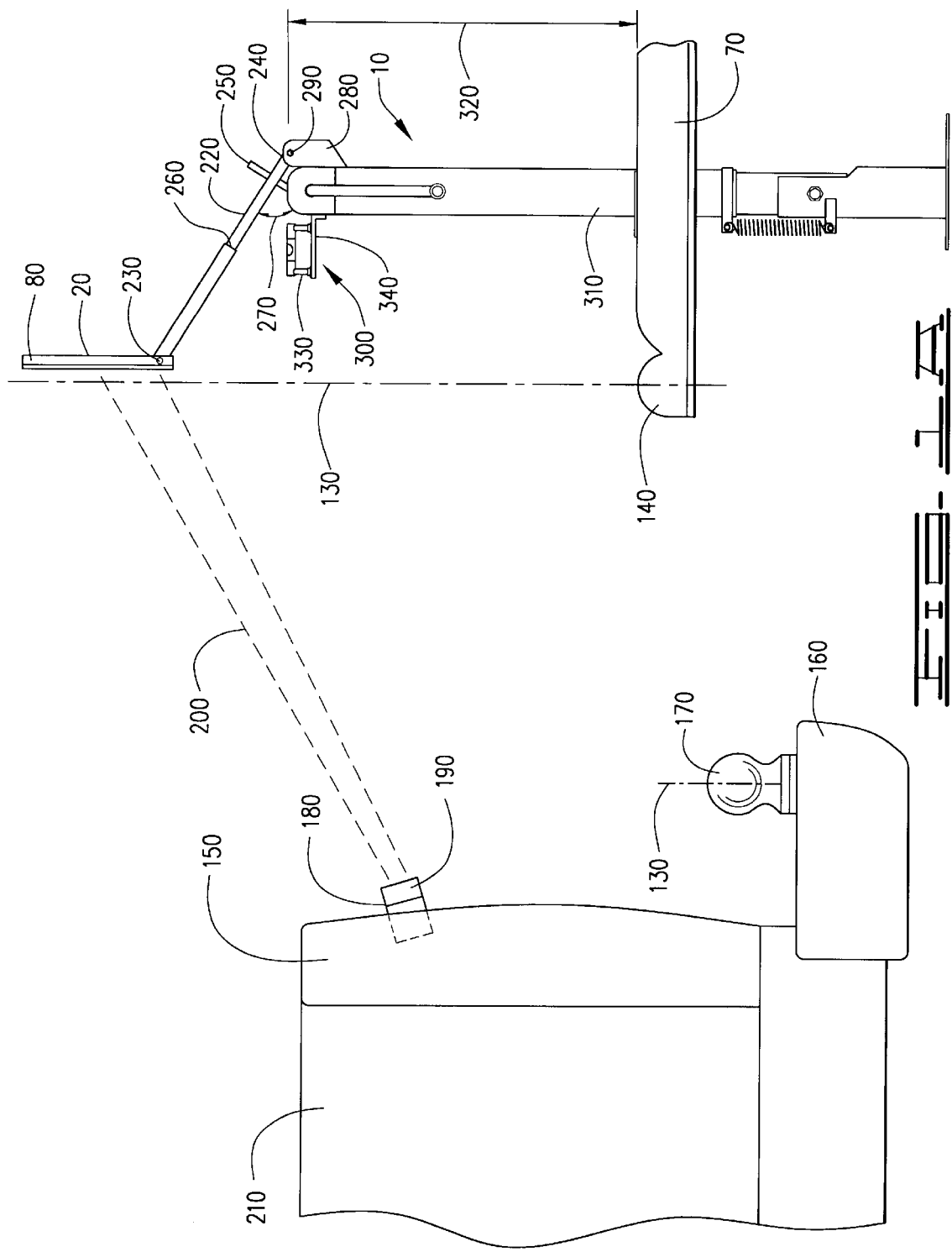
FIG. 1A is a side plan view of the jack apparatus of FIG. 1 shown in use with a trailer and a towing vehicle.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for purpose of description and should not be regarded as limiting.

Shown generally in FIGS. 1–3 is a jack apparatus 10 of the present invention. The jack apparatus 10 includes a target portion 20, an adjustment portion 30, an attachment member 40, a foot assembly 50, and means 60 for automatically moving the foot assembly 50 from a ground engaging configuration to an upright stored configuration. The jack apparatus 10 shown in FIG. 1A is attached to a tongue 70 of a trailer (not shown) and the tongue 70 of the trailer located such that, with the assistance of the target portion 20 of the jack apparatus 10, a towing vehicle 210 can be easily guided into a position suitable for hitching the trailer to the towing vehicle 210.

The target portion 20 includes a target assembly 80 having a target member 90 and a support assembly 100. The target member 90 may, as shown in FIG. 1, have a targeting spot 110 thereon. In an alternate embodiment, target member 90 may have at least two converging lines 120 (FIG. 1A) that terminate in the general area represented by targeting spot 110. In this manner, the at least two converging lines 120 perform an identical function of the targeting spot 110—i.e. provide a defined area on the target member 90 to be used for targeting and/or guiding the towing vehicle 210 into alignment with the tongue 70 of the trailer. The targeting spot 110 on the target member 90 is positioned so as to be aligned with a vertical plane 130 extending from the target member 90 down through the tongue 70 of the trailer.

The target assembly 80 is similar in construction and use as the trailer hitch coupling guide (which is identified as numeral "10") as shown in FIGS. 1–3 in parent application U.S. Ser. No. 09/918,196 entitled "TRAILER HITCH APPARATUS AND METHODS OF USING SAME" filed Jul. 30, 2001 which is expressly incorporated herein by reference in its entirety. In particular, target assembly 80 is used as a target or guide for directing the towing vehicle 210 towards the trailer during the process of hitching the trailer to the towing vehicle. As stated above, the target assembly 80 includes the target member 90 and targeting spot 110. The jack apparatus 10 is connected to the trailer via the attachment member 40. The tongue 70 of the trailer is provided with a socket portion 140. The towing vehicle 210 has a tailgate 150 and a bumper 160. The bumper 160 supports a trailer hitch assembly 170 for connection with the socket portion 140 of the tongue 70. A signal assembly 180 is mounted on the tailgate 150 and has a light emitting means 190 for emitting at least one light ray 200.

The target assembly 80, as already described, also includes the support assembly 100 which connects the target member 90 to the adjustment portion 30 of the jack apparatus 10. The support assembly 100 of the target assembly 80 further includes an extension assembly 220 which allows the target member 90 to be (1) slidably moved toward and away from the adjustment portion of the jack apparatus 10 and (2) angularly positioned away from the adjustment portion 30 of the jack apparatus 10. In particular, the extension assembly 220 includes a first connector 230, a second connector 240, and an angular loft regulator 250. The first connector 230 secures the extension assembly 220 to the target member 90 while the second connector 240 secures the extension assembly 220 to the adjustment portion 30 of the jack apparatus 10. As shown in FIG. 1, extension assembly 220 may also include an expansion joint 260 which allows the extension assembly 220 to be lengthened and/or shortened in order that the target member 90 may be kept within the vertical plane 130 at all times during operation. The angular loft regulator 250 controls a loft angle 270 which exists between the extension assembly 220 and the adjustment portion 30 of the jack apparatus 10. The angular loft regulator 250 may be any type of screw, plug, pin, or straight device capable of being reversibly placed through the width of the extension assembly 220 such that the loft angle 270 is directly influenced or set by the length of the angular loft regulator 250.

The target assembly 80 is mounted on the adjustment portion 30 of the jack apparatus 10 which is mounted to the trailer. The target member 90 is adjustably aligned with the vertical plane 130. The signal assembly 180 is operably associated with the tailgate 150 of the towing vehicle 210. The signal assembly 180 has a light emitting means 190 for emitting at least one light ray 200. The light emitting means 190 is mounted on the tailgate 150. The light emitting means 190 directs at least one light ray 200 in an upwardly and forwardly inclined direction toward the target member 90. The at least one light ray 200 engages and illuminates the targeting spot 110 of the target member 90 in accordance with an aligned position of the socket portion 140 of the tongue 70 with the trailer hitch assembly 170. In this manner, when the at least one light ray 200 engages and illuminates the targeting spot 110 of the target member 90, the socket portion 140 of the tongue 70 is positioned substantially above the trailer hitch assembly 170 and thus the towing vehicle 210 can be matingly connected with the trailer expeditiously and without exhaustive trial and error.

Figure 5:
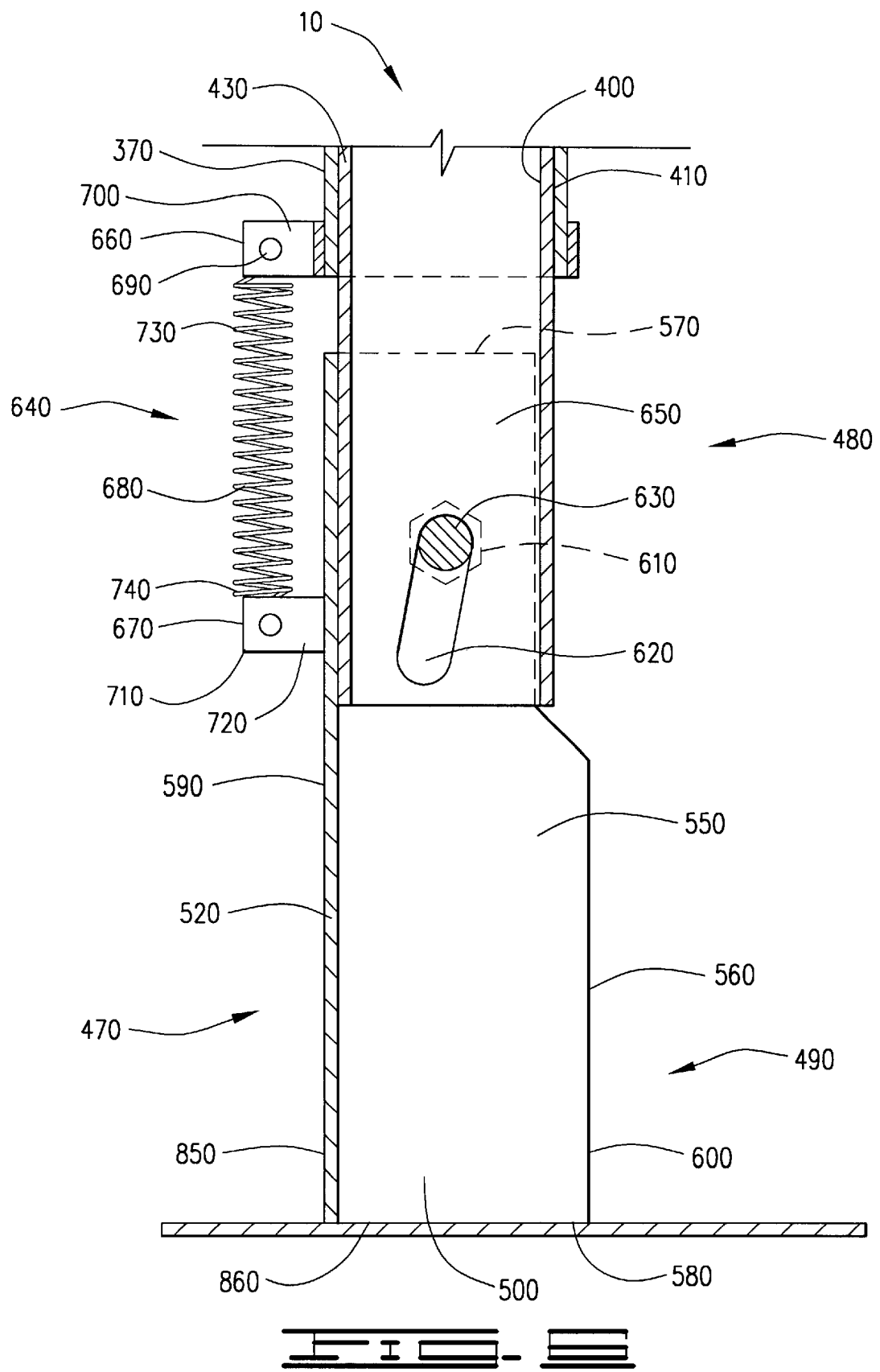
FIG. 5 is a fragmented elevational view of an alternate embodiment of a jack apparatus of the present invention.

A top portion 280 of the adjustment portion 30 of the jack apparatus 10 is connected to the extension assembly 220 of the support assembly 100 via the second connector 240. Indeed, and as shown in FIGS. 2 and 3, the second connector 240 is hingedly connected to the extension assembly 220 of the support assembly 100 via a pin connecting mechanism 290, although one of ordinary skill in the art given the present specification and embodiments would appreciate that several different methods of connecting the extension assembly 220 of the support assembly 100 to the jack apparatus 10 can be envisioned. Indeed, an alternative embodiment is shown in FIGS. 4 and 5 where the target member 90 is attached to the adjustment portion 30 in such a manner that it is capable of being moved in a circular manner in and out of position. The limiting factor is that the target member 90 and the loft angle 270 must be positionable within the vertical plane 130 in order that the trailer hitch assembly 170 of the towing vehicle 210 is in alignment with the tongue 70 of the trailer.

The adjustment portion 30 of the jack apparatus 10 further includes a means for leveling 300 the jack apparatus 10 and a vertical assembly 310 having an adjustable length 320. The leveling means 300 includes a level assembly 330 and a level platform 340. As can be appreciated by one of ordinary skill in the art, the leveling means 300 may be placed at any point on the adjustment portion 30 of the jack apparatus 10 and still be functional. In use, the leveling means 300 is set to an initial baseline state of level when the trailer is either attached to the towing vehicle 210 or set on the ground in a leveled state using the jack apparatus 10 of the present invention. By using the leveling means 300 in such a manner, a user need only level the trailer once as the trailer may be subsequently releveled easily by simply making certain that the level assembly 330 is reading "level". Additionally, leveling means 300 can be used to ensure that the targeting spot 110 of the target member 90 is kept in an engaged and aligned configuration with the light emitting means 190. For example, once the targeting spot 110 is initially aligned with the at least one converging light ray 200, the leveling means 300 can be set to read level. As such, the targeting spot 110 can be realigned during a backing up attachment maneuver with the light emitting means 190 simply by raising the target member 90 such that the leveling means 300 reads "level".

As stated previously, the vertical assembly 310 of the adjustment portion 30 has an adjustable length 320. The adjustable length 320 of the vertical assembly 310 is lengthened or shortened by an extension means 350 for extending the length of the vertical assembly 310. The extension means 350 includes a handle assembly 360, an outer sleeve 370, an inner sleeve 380, and a cam assembly (not shown) having a turn screw 390. The vertical assembly 310 is basically comprised of (1) the inner sleeve 380, having an interior surface 400, an exterior surface 410, and a closed top portion 420; and (2) and the outer sleeve 370, having an interior surface 430 and an exterior surface 440. In use, the inner sleeve 380 rests within the outer sleeve 370 such that the exterior surface 410 of the inner sleeve 380 is disposed substantially adjacent the interior surface 430 of the outer sleeve 370. The exterior surface 440 of the outer sleeve 370 makes up the majority of the exterior of the jack apparatus 10—i.e. the level assembly 330 is attached to the exterior surface 440 of the outer sleeve 370 as shown in FIGS. 1–3.

The turn screw 390 is operably attached to the cam assembly (not shown) located generally in the top portion 280 of the adjustment portion 30 and extends through the closed top portion 420 of the inner sleeve 380. The turn screw 390 may be threaded through the closed top portion 420 of the inner sleeve 380 such that when the turn screw 390 is turned in a clockwise or counterclockwise motion, the closed top portion 420 of the inner sleeve 380 is either moved upwardly or downwardly along the turn screw 390. In operation, the adjustable length 320 of the vertical assembly 310 is lengthened or shortened by turning the handle assembly 360 which extends through the top portion 280 of the adjustment portion 30 and is as such operably connected to the cam assembly (not shown) which in turn rotates the turn screw 390 such that the closed top portion 420 of the inner sleeve 380 is moved upwardly or downwardly and consequently the inner sleeve 380 is moved upwardly or downwardly relative to the outer sleeve 370. Thus the adjustable length 320 may be lengthened or shortened.

The attachment member 40 is attached to the trailer by a plurality of bolts 450 such that the jack apparatus 10 is placed near the tongue 70 of the trailer. The attachment member 40 is located adjacent the exterior surface 440 of the outer sleeve 370.

The jack apparatus 10 further includes a foot assembly 50 which is capable of being reversibly moved from a ground engaging configuration to an upright stored configuration for travel. The foot assembly 50 includes a base plate 460 and a support assembly 470. The support assembly 470 is generally square in cross-section and mimics the shape of the inner sleeve 380 to which the support assembly 470 is attached. The support assembly 470 of the foot assembly 50 has a top portion 480, a bottom portion 490, and includes at least three sides: (1) a solid first side 500; (2) a solid second side 510; and (3) a solid rear side 520, which are attached to one another along an edge such that the at least three sides form a squared "U". The interior of the "U" formed from the solid first side 500, the solid second side 510 and the solid rear side 520 defines an interior portion 530 and the "U" therefore has an interior surface 540 and an exterior surface 550. The interior surface 540 is substantially adjacent the exterior surface 410 of the inner sleeve 380.

The support assembly 470 also includes a front side 560 which may be open, solid, or partially solid. The solid first side 500 has a top edge 570, a bottom edge 580, a rear edge 590, and a front edge 600. The top edge 570 is parallel to the bottom edge 580 throughout the entirety of the top edge 570. In an alternative embodiment, the top edge 570 is not parallel to the bottom edge 580 throughout the entirety of the top edge 570; rather the top edge 570 has a predefined outward convex curve extending from where the top edge 570 connects to the rear edge 860 and flowing to where the top edge 570 meets the front edge 600. In this alternative embodiment there is no right angle formed where the top edge 570 meets the front edge 600. Similarly, in this alternative embodiment the solid second side 510 has a corresponding predefined curve therein.

The solid first side 500 also has a slot 610 therein. The slot 610 is about ½ inch in diameter. The solid second side 510 has a corresponding slot 610a therein. Slots 610 and 610a matingly engage angled slots 620 and 620a which are from about ½ inch to 3 inches long and are angled downward beginning in the general area of the front of the top edge 570 and extending toward where the rear edge 860 meets the bottom edge 580 of the solid first side 500. Angled slots 620 and 620a extend from the exterior surface 410 of the inner sleeve 380 to the interior surface 400 of the inner sleeve 380. A connecting pin 630 extends from the exterior surface 550 of the solid first side 500 through the slot 610 of the solid first side 500, through the angled slots 620 of the inner sleeve 380, through the inner sleeve 380, out the angled slots 620 on the parallel side of the inner sleeve 380, and through the angled slots 620 on the solid second side 510 of the support assembly 470. In this manner, the connecting pin 630 loosely connects the support assembly 470 of the foot assembly 50 to the inner sleeve 380 of the vertical assembly 310.

The jack apparatus 10 further includes means 60 for automatically moving the foot assembly 50 from the ground engaging configuration to the upright stored configuration. The automatic moving means 60 includes a tension assembly 640 and a pivot assembly 650. The tension assembly 640 includes a first connection 660, a second connection 670, and a tension spring 680. The tension assembly 640 facilitates the moving of the foot assembly 50 from the ground engaging configuration to the stored upright configuration and additionally ensures that the foot assembly 50 does not wobble, buckle, or collapse when in the ground engaging configuration. Alternatively, tension spring 380 may comprise a solid or substantially solid support such as a metal bar, a telescoping cone and/or a rubber or other synthetic mass capable of placing tension between the outer sleeve 370 and the support assembly 470 of the foot assembly 50.

A fragmented side elevational view of the jack apparatus 10 showing in particular detail the automatic moving means 60 is shown in FIG. 6 in which the jack apparatus 10 is shown with the foot assembly 50 being in the ground engaging configuration. The first connection 660 is attached to the exterior surface 440 of the outer sleeve 370. The first connection 660 includes an attachment member 690 which is connected to a bracket 700. The bracket 700 is welded or fastened in any other manner to the exterior surface 440 of the outer sleeve 370. The second connection 670 includes a second attachment member 710 and a second bracket 720. The second bracket 720 is attached to the exterior surface 550 of the solid rear side 520 of the support assembly 470. The second bracket 720 is welded or fastened in any other manner to the exterior surface 550 of the solid rear side 520 of the support assembly 470.

The tension spring 680 has a first end 730 connected to the attachment member 690 of the first connection 660 and a second end 740 connected to the second attachment member 710 of the second connection 670. The tension assembly 640 is thus capable of biasingly connecting the outer sleeve 370 of the vertical assembly 310 to the support assembly 470 of the foot assembly 50. As one of ordinary skill in the art could appreciate, the tension spring 680 exerts a force against the support assembly 470.

The jack apparatus 10 also has a second tension assembly 750 on the opposing side of the jack apparatus 10 from the tension assembly 640. The second tension assembly 750 includes a first connection 760, a second connection 770, and a tension spring 780. The first connection 760 is attached to the exterior surface 440 of the outer sleeve 370. The first connection 760 includes an attachment member 790 which is connected to a bracket 800. The bracket 800 is welded or fastened in any other manner to the exterior surface 440 of the outer sleeve 370. The second connection 770 includes a second attachment member 810 and a second bracket 820. The second bracket 820 is attached to the exterior surface 550 of the solid rear side 520 of the support assembly 470. The second bracket 820 is welded or fastened in any other manner to the exterior surface 550 of the solid rear side 520 of the support assembly 470.

The tension spring 780 has a first end 830 connected to the attachment member 790 of the first connection 760 and a second end 840 connected to the second attachment member 810 of the second connection 770. The second tension assembly 750 is thus capable of biasingly connecting the outer sleeve 370 of the vertical assembly 310 to the support assembly 470 of the foot assembly 50. As one of ordinary skill in the art could appreciate, the tension spring 780 exerts a force against the support assembly 470.

Figure 7:
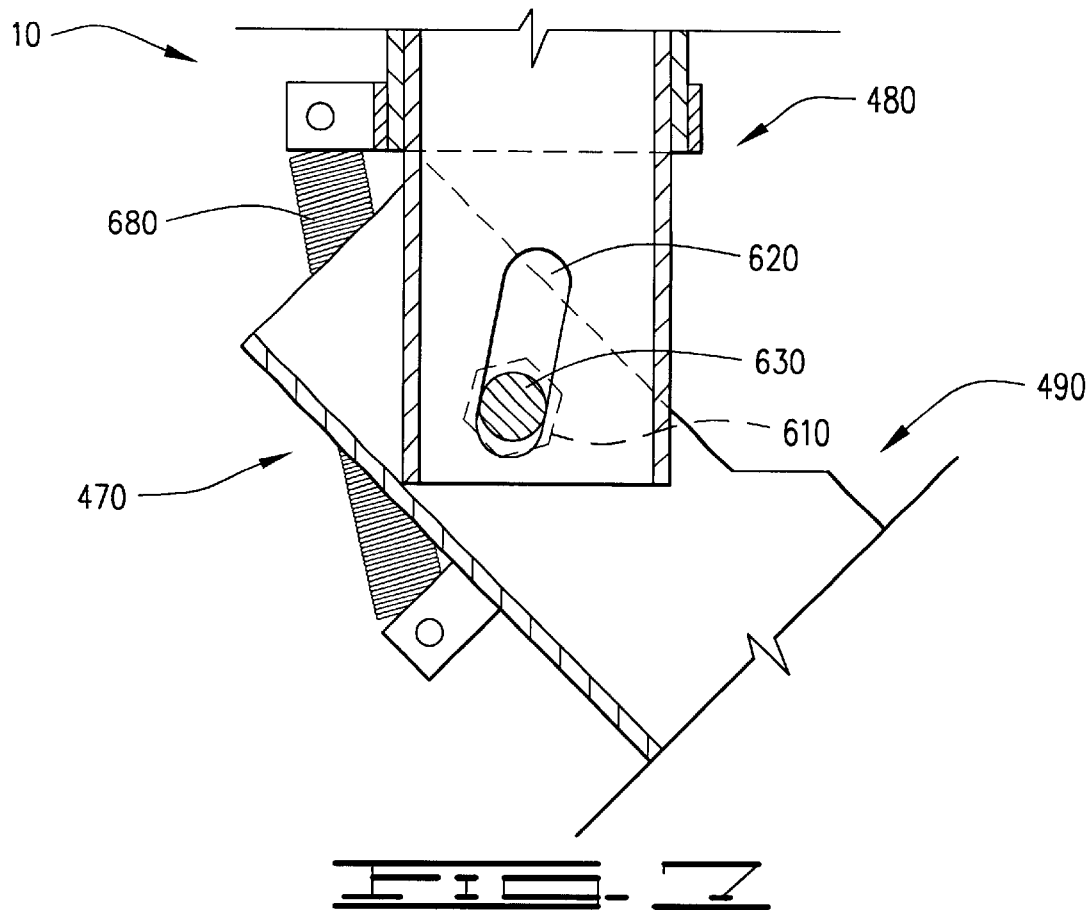
FIG. 7 is a fragmented side elevational view of the foot portion of a jack apparatus of the present invention showing the foot portion in transition between the ground engaging configuration and the upright stored configuration.
Figure 8:
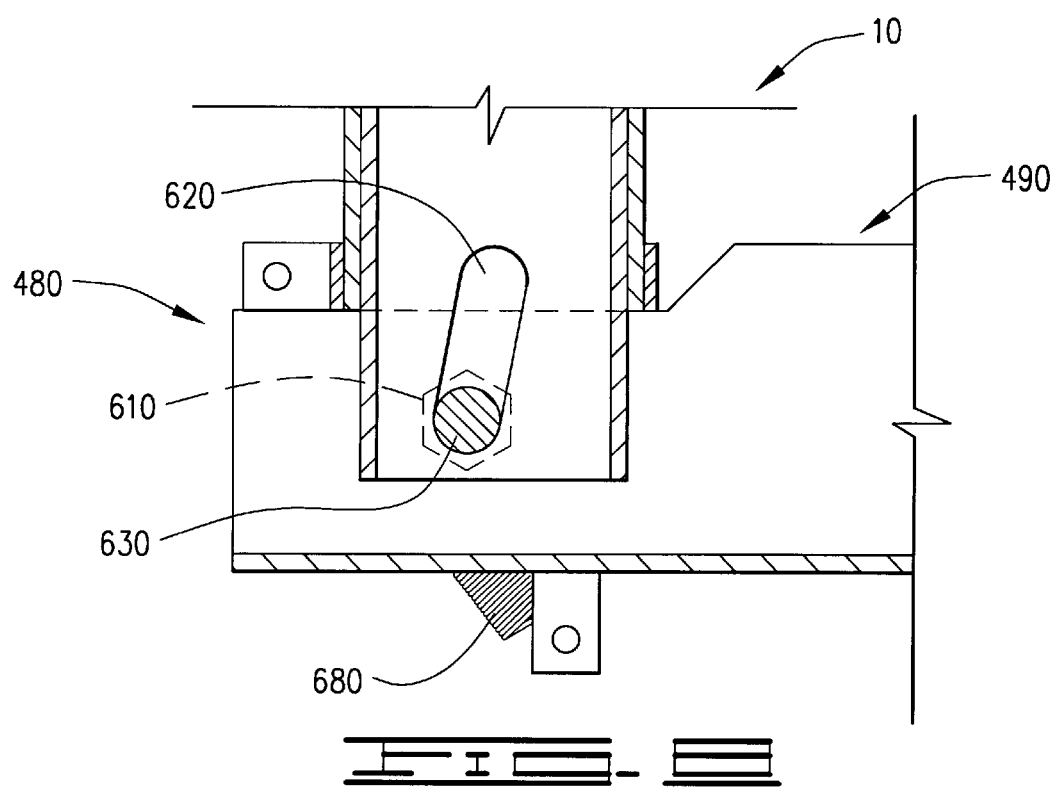
FIG. 8 is a fragmented side elevational view of the foot portion of a jack apparatus of the present invention showing the foot portion in an upright stored configuration.

The pivot assembly 650 includes the connecting pin 630, the slot 610, and the angled slots 620. As can be seen in FIGS. 6–8, the pivot assembly 650 allows for the foot assembly 50 to be automatically raised from a ground engaging configuration to an upright stored configuration. In particular, when the inner sleeve 380 is moved upward in the vertical assembly 310 (i.e. the adjustable length 320 of the vertical assembly 310 is shortened) the foot assembly 50 connected to the inner sleeve 380 is also moved upward towards the vertical assembly 310 and into place.

In the alternative embodiment discussed hereinabove, as the foot assembly 50 may be moved upward in the vertical assembly 310, the predefined curve will engage a bottom peripheral edge 850 of the outer sleeve 370. As the predefined curve engages the bottom peripheral edge 850 of the outer sleeve 370, the foot assembly 50 is moved into the upright stored configuration.

In either embodiment, the front edge 600 of support assembly 470 of the foot assembly 50 will eventually be adjacent the bottom peripheral edge 850 of the outer sleeve 370 when the foot assembly 50 is fully in the upright stored configuration. The connecting pin 630 also facilitates the movement of the foot assembly 50 from the ground engaging configuration to the upright stored configuration. The connecting pin 630 which is stationary in the slot 610 in the support assembly 470 moves downwardly along the angled slots 620 while the inner sleeve 380 is moved upwardly in the vertical assembly 310. The movement of the connecting pin 630 in the angled slots 620 assures that the foot assembly 50 is moved from the ground engaging configuration to the upright stored configuration. In order to place the foot assembly 50 into the ground engaging configuration once again, the inner sleeve 380 is moved downward in the vertical assembly 310. In combination with the tension springs 680, 780, the connecting pin 630, and the angled slots 620, the foot assembly 50 is capable of being automatically moved into the ground engaging configuration from an upright stored configuration or vice versa.

From the above description it is clear that the present invention is well adapted to carry out the objects and to attain the advantages mentioned herein as well as those inherent in the invention. While presently preferred embodiments of the invention have been described for purposes of this disclosure, it will be understood that numerous changes may be made which will readily suggest themselves to those skilled in the art and which are accomplished within the spirit in the art which are accomplished within the spirit of the invention disclosed and as defined in the following claims.

What I claim is:

1. A jack apparatus, comprising:
    an adjustment portion comprising a vertical assembly having (i) an outer sleeve having an exterior surface, (ii) an inner sleeve, and (iii) an adjustable length; and
    a foot assembly capable of being reversibly moved from a ground engaging configuration to a stored horizontal configuration when the adjustable length of the vertical assembly is changed, the foot assembly having an external surface; and
    means for automatically moving the foot assembly from the ground engaging configuration to the stored horizontal configuration, the automatic foot assembly moving means includes at least one angled slot, a tension assembly and a pivot assembly, the at least one angled slot being angularly positioned to a vertical plane extending through the jack apparatus, wherein the tension assembly is operably connected at a first end to the exterior surface of the outer sleeve of the vertical assembly and a second end of the tension assembly is operably connected to the exterior surface of the foot assembly further wherein the at least one angled slot in combination with the tension assembly and the pivot assembly moves the foot assembly rotationally about 90 degrees along an axis of the pivot assembly and angularly along the at least one angled slot to thereby move the foot assembly from the ground engaging configuration to the stored horizontal configuration.

2. The jack apparatus of claim 1, wherein the length of the vertical assembly is adjusted by a means for extending the length of the vertical assembly.

3. The jack apparatus of claim 1, further including a target assembly, wherein the target assembly further includes a support assembly for holding the target assembly in a predefined angular position relative to the vertical assembly.

4. The jack apparatus of claim 1, wherein the tension assembly includes two springs operably associated with opposing sides of the vertical assembly and the foot assembly.

* * * * *